UNITED STATES PATENT OFFICE.

CHARLES WALPUSKI, OF NEW YORK, N. Y.

INK-ERASING COMPOUND.

SPECIFICATION forming part of Letters Patent No. 314,759, dated March 31, 1885.

Application filed August 1, 1884. (Specimens.)

*To all whom it may concern:*

Be it known that I, CHARLES WALPUSKI, of the city, county, and State of New York, have invented certain new and useful Improvements in Ink-Erasing Compounds, of which the following is a specification.

This invention has reference to a cheap and effective ink-erasing composition, by which ink, pencil, and other marks can be quickly erased; and the invention consists of a mixture of clay, pulverized pumice-stone, and dissolved glue or other binding medium, to be used as an erasing composition.

The erasing composition is prepared in the following manner: One part of finely-pulverized clay is mixed with from four to seven parts of an erasing substance, such as pulverized pumice-stone, emery, glass, quartz, or other suitable abrading material, and with twenty-five parts of dissolved glue, gums, or a suitable binding medium. The parts are thoroughly mixed until a uniform and easily-flowing mass is obtained, which is then pressed into the required shape. After being molded and pressed into shape they are dried and hardened to the proper degree of hardness.

The mass may be used either as a core and inclosed by a covering of wood—as the common lead-pencils—or the mass may be made up in sticks and used in connection with suitable cases in the same manner as adjustable pencils, or pressed into any other suitable shape for use.

Having thus described my invention, I claim as new and desire to secure by Letters Patent—

An ink-erasing composition consisting of finely-pulverized clay, pulverized pumice-stone, and dissolved glue or other binding medium, mixed and dried without burning, substantially as set forth.

In testimony that I claim the foregoing as my invention I have signed my name in presence of two subscribing witnesses.

CHARLES WALPUSKI.

Witnesses:
PAUL GOEPEL,
SIDNEY MANN.